(12) United States Patent
Dannoux et al.

(10) Patent No.: US 8,875,543 B2
(45) Date of Patent: Nov. 4, 2014

(54) METHODS AND SYSTEMS FOR FORMING CONTINUOUS GLASS SHEETS

(75) Inventors: Thierry Luc Alain Dannoux, Avon (FR); Ronan Tanguy, Grez sur Loing (FR)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 13/319,422

(22) PCT Filed: May 11, 2010

(86) PCT No.: PCT/US2010/034345
§ 371 (c)(1),
(2), (4) Date: Nov. 8, 2011

(87) PCT Pub. No.: WO2010/132419
PCT Pub. Date: Nov. 18, 2010

(65) Prior Publication Data
US 2012/0047951 A1  Mar. 1, 2012

(30) Foreign Application Priority Data

May 13, 2009  (EP) .................................... 09305425

(51) Int. Cl.
*C03B 17/06*  (2006.01)
*C03B 23/047*  (2006.01)
*C03B 40/04*  (2006.01)

(52) U.S. Cl.
CPC .............. *C03B 17/06* (2013.01); *C03B 23/0476* (2013.01); *C03B 40/04* (2013.01)
USPC ....................... 65/87; 65/86; 65/67

(58) Field of Classification Search
CPC .... C03B 17/04; C03B 33/06; C03B 23/0496; C03B 9/10
USPC ................................................ 65/82–88, 435
See application file for complete search history.

(56) References Cited

U.S. PATENT DOCUMENTS

| 766,275 A | 8/1904 | Lubbers |
| 822,678 A | 6/1906 | Lubbers |

(Continued)

FOREIGN PATENT DOCUMENTS

| CN | 1615278 | 9/2008 |
| GB | 826585 A | 6/1957 |

(Continued)

OTHER PUBLICATIONS

Machine Translation CN1615278.

(Continued)

*Primary Examiner* — Jodi C Franklin
(74) *Attorney, Agent, or Firm* — Robert L Carlson

(57) ABSTRACT

A method for forming a continuous glass sheet from a tube of glass includes expanding and thinning the tube of glass by drawing the tube of glass over susceptor bearing comprising a porous sidewall defining an internal chamber. The diameter of the susceptor bearing may increase between a top portion and a bottom portion. The tube of glass may be maintained at a temperature above a softening point of the glass as the tube of glass is drawn over the susceptor bearing. The tube of glass is suspended over the susceptor bearing by blowing the tube of glass away from the susceptor bearing in a radial direction with a pressurized fluid supplied to the internal chamber and emitted from the porous sidewall as the tube of glass is drawn over the susceptor bearing. Thereafter, the tube of glass is cooled and sectioned to form a continuous glass sheet.

20 Claims, 5 Drawing Sheets

(56) References Cited

U.S. PATENT DOCUMENTS

| | | | |
|---|---|---|---|
| 1,653,848 A * | 12/1927 | Grotta | 65/86 |
| 1,881,327 A * | 10/1932 | Powell | 65/26 |
| 2,009,793 A * | 7/1935 | Sanchez-Vello | 65/87 |
| 2,267,554 A * | 12/1941 | Despret | 65/192 |
| 2,457,785 A * | 12/1948 | Games et al. | 65/181 |
| 2,765,586 A * | 10/1956 | Wilson | 65/187 |
| 3,035,371 A * | 5/1962 | Zangari et al. | 65/161 |
| 3,298,808 A * | 1/1967 | Macks | 65/25.1 |
| 3,399,983 A | 9/1968 | Chapman | |
| 3,802,858 A * | 4/1974 | Minegishi | 65/83 |
| 3,806,329 A * | 4/1974 | Brichard | 65/95 |
| 4,228,206 A * | 10/1980 | Fabisak | 428/34.6 |
| 4,303,436 A * | 12/1981 | Rossi | 65/67 |
| 4,941,904 A * | 7/1990 | Barch et al. | 65/494 |
| 7,475,567 B2 * | 1/2009 | Maenner et al. | 65/86 |
| 2001/0055930 A1 * | 12/2001 | Ott et al. | 445/9 |
| 2002/0134108 A1 * | 9/2002 | Werdecker et al. | 65/17.6 |
| 2005/0076675 A1 * | 4/2005 | Bogdahn et al. | 65/29.12 |
| 2005/0227027 A1 * | 10/2005 | Maenner et al. | 428/34.4 |
| 2006/0123851 A1 * | 6/2006 | Sato et al. | 65/393 |
| 2006/0260360 A1 * | 11/2006 | Dick et al. | 65/60.53 |
| 2007/0087194 A1 * | 4/2007 | Singer | 428/379 |
| 2009/0047454 A1 * | 2/2009 | Maenner et al. | 428/34.4 |
| 2009/0064715 A1 * | 3/2009 | Horn et al. | 65/32.5 |
| 2010/0107694 A1 * | 5/2010 | Dannoux et al. | 65/60.1 |
| 2012/0042692 A1 * | 2/2012 | Fredholm et al. | 65/25.1 |
| 2013/0186143 A1 * | 7/2013 | Ziegler et al. | 65/86 |

FOREIGN PATENT DOCUMENTS

| | | |
|---|---|---|
| GB | 904584 A | 2/1959 |
| WO | 2006121709 A1 | 11/2006 |
| WO | 2008093153 A1 | 8/2008 |

OTHER PUBLICATIONS

CN201080021475.9 Search Report.

* cited by examiner

US 8,875,543 B2

METHODS AND SYSTEMS FOR FORMING CONTINUOUS GLASS SHEETS

CROSS REFERENCE TO RELATED APPLICATIONS

This application claims the benefit of, and priority to European Patent Application No. 09305425.2 filed on May 13, 2009 entitled, "Methods and Systems For Forming Continuous Glass Sheets", the content of which is relied upon and incorporated herein by reference in its entirety.

FIELD

The embodiments described herein generally relate to methods and systems for forming glass sheets, and, more particularly, to methods and apparatus for forming thin, continuous glass sheets.

TECHNICAL BACKGROUND

Organic light emitting diodes (OLEDs) have been the subject of a considerable amount of research in recent years because of their potential for use in a wide variety of electroluminescent devices. For instance, a single OLED can be used as a discrete light emitting device or an array of OLEDs can be used in lighting applications or flat-panel applications such as flexible displays. However, OLED displays and, in particular, the electrodes and organic layers of individual OLEDs, may be susceptible to degradation resulting from interaction with oxygen and moisture. Polymeric materials used as substrates in flexible OLED displays may be permeable to oxygen and moisture and, therefore, are not effective for sealing displays and preventing the degradation of the OLED devices. Metal foils offer a suitable alternative to polymeric materials as some metal foils may be impermeable to both oxygen and moisture. However, the optical properties of the metal foils, specifically the transparency or lack of transparency of the metal foils, make the foils unsuitable for use in conjunction with OLED display devices.

Glass may be a suitable alternative to both polymeric materials and metal foils for use in conjunction with OLED displays. Glass provides the desired optical transparency while being impermeable to moisture and oxygen. As such, glass may be suitable to form a hermetic seal around OLEDs in a display. However, glass is not generally a flexible material, except when the glass is ultra-thin and existing methods for producing ultra-thin glass are not suitable for large volume, commercial production.

Accordingly, a need exists for alternative methods and systems for producing thin, continuous sheets of glass.

SUMMARY OF THE INVENTION

According to one embodiment shown and described herein, a method for forming a continuous glass sheet includes expanding and thinning a tube of glass by drawing the tube of glass over a susceptor bearing comprising a porous sidewall defining an internal chamber. A diameter of the susceptor bearing may increase between a top portion of the susceptor bearing and a bottom portion of the susceptor bearing. The tube of glass may be maintained at a temperature above a softening point of the glass as the tube of glass is drawn over the susceptor bearing. The tube of glass may be suspended over the susceptor bearing by blowing the tube of glass away from the susceptor bearing in a radial direction with a pressurized fluid supplied to the internal chamber and emitted from the porous sidewall as the tube of glass is drawn over the susceptor bearing. Thereafter, the tube of glass may be cooled and sectioned to form a continuous glass sheet.

In another embodiment, a system for forming a continuous glass sheet includes a susceptor bearing, a heating system surrounding the susceptor bearing, a drawing mechanism and a cutting device. The susceptor bearing may include a porous sidewall defining an internal chamber for receiving a pressurized fluid. A diameter of the susceptor bearing may increase between a top portion of the susceptor bearing and a bottom portion of the susceptor bearing. The susceptor bearing may be operable to emit the pressurized fluid through the porous sidewall such that, when a heated tube of glass is drawn over the susceptor bearing, the heated tube of glass is blown away from the susceptor bearing in a radial direction thereby suspending the tube of glass over the susceptor bearing. The heating system may cooperate with the pressurized fluid emitted from the susceptor bearing to regulate a temperature of a tube of glass drawn over the susceptor bearing. The drawing mechanism is disposed below the susceptor bearing and includes at least one tractor wheel positioned to contact the tube of glass and draw the tube of glass over the susceptor bearing in a downward direction. The cutting device may be positioned below the drawing mechanism and may be operable to section the tube of glass into a continuous glass sheet.

Additional features and advantages of the embodiments described herein will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are intended to provide an overview or framework for understanding the nature and character of the claims. The accompanying drawings are included to provide a further understanding of the embodiments described herein, and are incorporated into and constitute a part of this specification. The drawings illustrate various embodiments described herein and, in conjunction with the description, serve to explain the principles and operations of the described embodiments.

DETAILED DESCRIPTION

Figure 1:
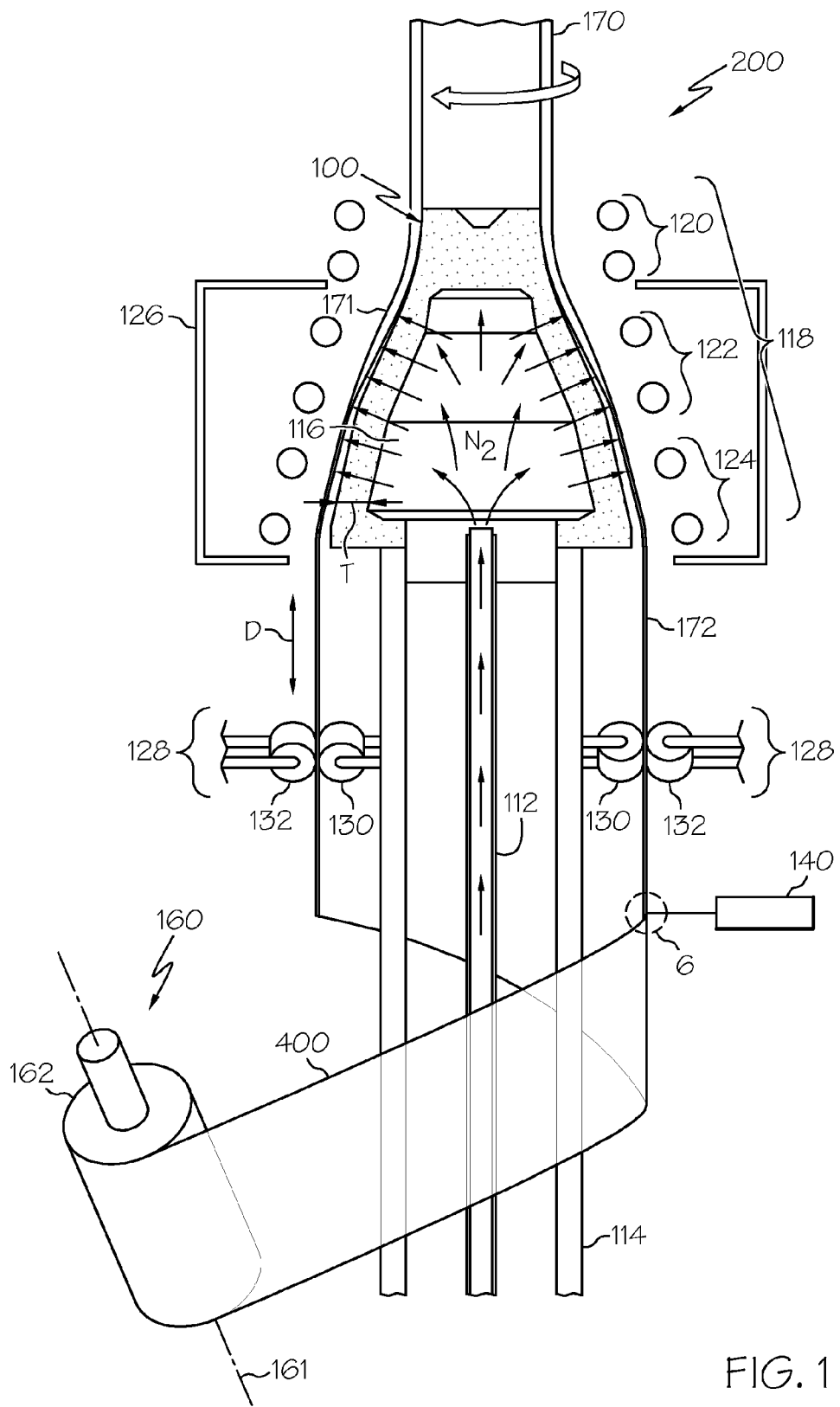
FIG. 1 is a schematic diagram of a cross section of a system for producing continuous glass sheet according to one or more embodiments shown and described herein.

Reference will now be made in detail to various methods and apparatus for forming continuous glass sheets described herein, examples of which are illustrated in the accompanying drawings. Whenever possible, the same reference numerals will be used throughout the drawings to refer to the same or like parts. One embodiment of a system for producing continuous glass sheet from a tube of glass is shown in FIG. 1. The system generally comprises a substantially bell-shaped susceptor bearing, a heating system, a drawing system and a cutting device. Various embodiments of the system and methods for using the system to form continuous sheets of glass will be described in more detail herein.

Figure 2:
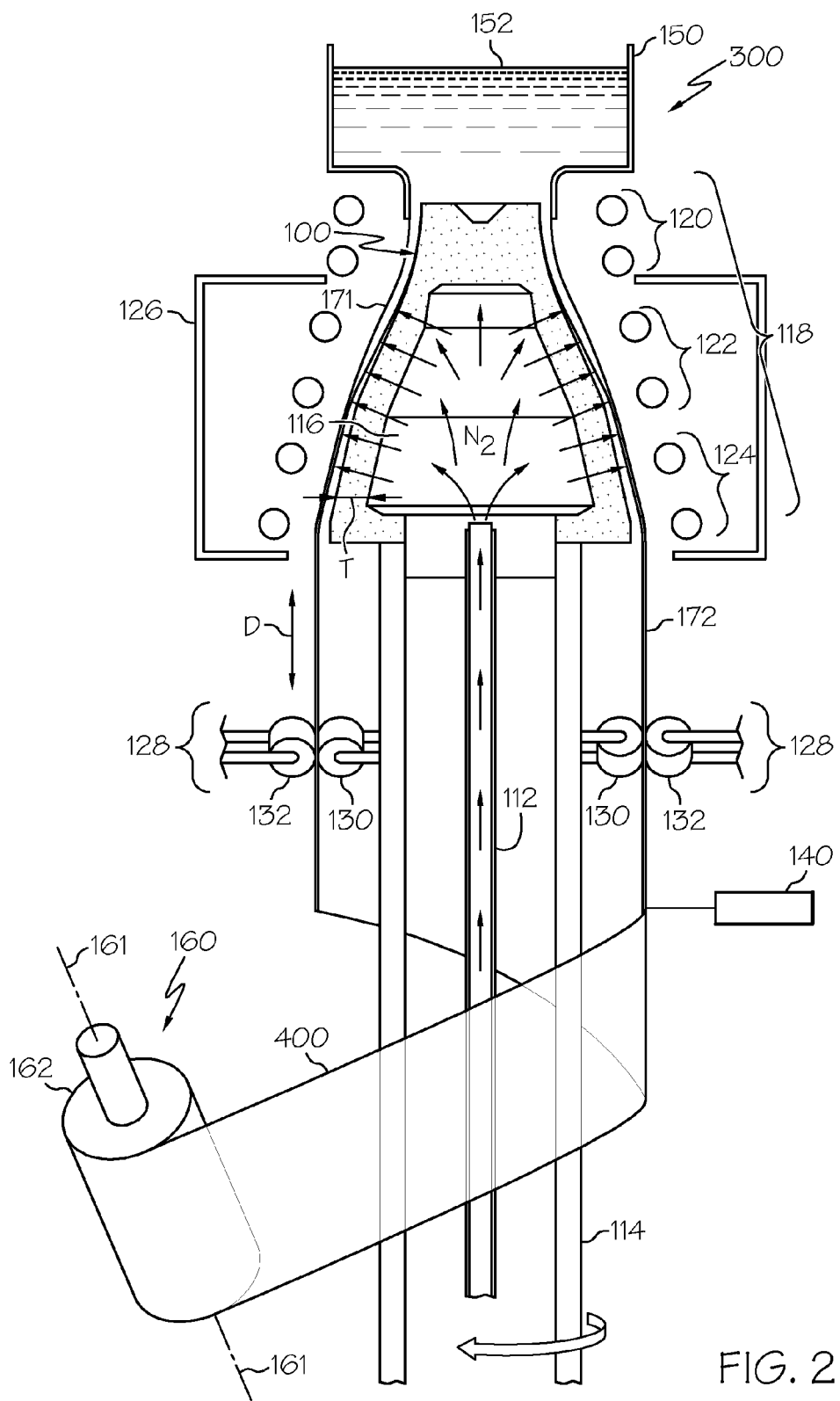
FIG. 2 is a schematic diagram of a cross section of a system for producing continuous glass sheet according to one or more embodiments shown and described herein.

Referring now to FIGS. 1 and 2, two embodiments of systems 200, 300 for forming a continuous sheet of glass from a tube of glass are schematically illustrated in cross section. The systems 200, 300 are vertically oriented and may generally comprise a susceptor bearing 100, a heating system 118, a drawing mechanism 128, and a cutting device 140. The systems 200, 300 may additionally comprise a take-up mechanism 160 for winding continuous glass sheet on to a roll or storage spool. The system 300 shown in FIG. 2 may additionally comprise a glass delivery tank 150 for containing molten glass 152.

Figure 3:
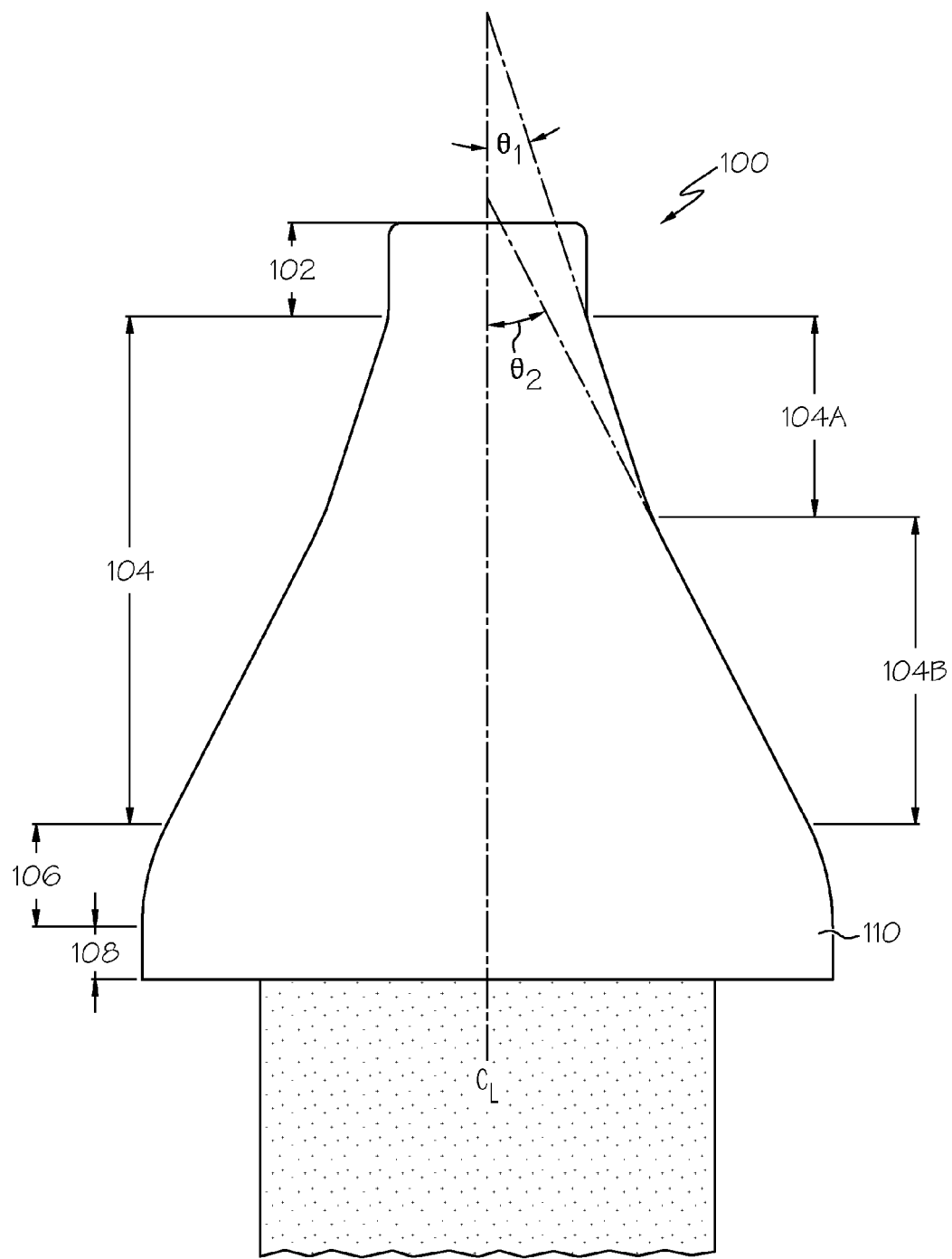
FIG. 3 is a schematic diagram of one embodiment of a susceptor bearing for use in the systems for producing continuous glass sheets shown in FIGS. 1 and 2.

Referring now to FIGS. 1-3, the susceptor bearing 100 may be substantially bell-shaped and rotationally symmetric about a centerline $C_L$. The susceptor bearing 100 may comprise a sidewall 110 that defines on internal chamber 116 (shown in FIGS. 1 and 2). In one embodiment, the susceptor bearing 100 may comprise a top portion 102, an upper intermediate portion 104, a lower intermediate portion 106, and a bottom portion 108, as depicted in FIG. 3. The top portion 102 and the bottom portion 108 may be substantially cylindrical with the bottom portion 108 having a diameter greater than the diameter of the top portion 102. For example, the top portion 102 may have a diameter from about 28 mm to about 350 mm while the bottom portion 108 may have a diameter from about 60 mm to about 700 mm.

The upper intermediate portion 104 may be substantially conical such that the diameter of the susceptor bearing 100 increases from the top portion 102 to the lower intermediate portion 106. For example, in one embodiment, the upper intermediate portion 104 may be shaped such that the surface of the sidewall 110 forms an angle from about 30° to about 45° with the centerline $C_L$ of the susceptor bearing 100.

The lower intermediate portion 106 may be substantially spherical. The term substantially spherical, as used herein, means that the lower intermediate portion 106 of the susceptor bearing 100 has a uniform radius of curvature at the surface of the susceptor bearing which, if extended, would form a sphere. Accordingly, it will be understood that the lower intermediate portion 106 of the susceptor bearing 100 may have a geometrical configuration similar to a cross section of a sphere. For example, the surface of the susceptor bearing 100 in the lower intermediate portion 106 may have a radius of curvature which forms a transition between the substantially conical shape of the upper intermediate portion 104 and the substantially cylindrical shape of the bottom portion 108.

In one embodiment, the upper intermediate portion 104 may comprise a first section 104A and a second section 104B. The surface of the sidewall 110 in the first section 104A may form a first angle $\theta_1$ with respect to the centerline $C_L$ while the surface of the sidewall 110 in the second section 104B may form a second angle $\theta_2$ with respect to the centerline $C_L$, where $\theta_1 < \theta_2$.

While the susceptor bearing 100 is described herein as being substantially bell-shaped and comprising a top portion 102, an upper intermediate portion 104, a lower intermediate portion 106, and a bottom portion 108, it should be understood that the susceptor bearing 100 may have other configurations. For example, the susceptor bearing 100 may be substantially conical in shape or, alternatively, substantially parabolic in shape. Accordingly, it will be understood that the susceptor bearing may be of any configuration suitable for expanding and thinning a tube of heated glass drawn over the surface of the susceptor bearing, as will be described in more detail herein.

Still referring to FIGS. 1-3, the sidewall 110 of the susceptor bearing 100 may be porous such that a pressurized fluid introduced into the internal chamber 116 may be emitted from the susceptor bearing 100 through the sidewall 110. For example, the material from which the susceptor bearing 100 is formed may have a porosity of greater than about 1%, more preferably greater than about 2% and, most preferably, from about 3% to about 6%. The material from which the susceptor bearing 100 is formed should be stable at elevated temperatures such that the susceptor bearing does not contaminate heated glass drawn over the susceptor bearing.

In one embodiment, the susceptor bearing 100 is formed from a porous carbon material, such as Ref 2020 produced by Carbon Lorraine of France. Ref. 2020 generally comprises an average carbon grain size from about 5 microns to about 20 microns and a porosity of about 4%. When the susceptor bearing 100 is formed from carbon, the sidewall 110 may have a radial thickness T from about 6 mm to about 12 mm. In one embodiment, the radial thickness T of the sidewall 110 may be substantially uniform from the top portion 102 to the bottom portion 108. Alternatively, the radial thickness T of the sidewall 110 may be non-uniform. For example, when the radial thickness T of the sidewall 110 is non-uniform, the radial thickness may vary up to about 30% of the maximum radial thickness T of the sidewall 110. In this embodiment, the areas of the sidewall having a reduced radial thickness may be more permeable to a pressurized gas introduced into the internal chamber 116 and, therefore, may have a greater local flux of gas through the sidewall 110.

While one example of a susceptor bearing 100 is described herein as comprising a porous carbon material, it should be understood that the susceptor bearing may be formed from other porous materials which are stable at high temperatures, such as ceramic materials. For example, in one embodiment cordierite ceramic or a similar ceramic material may be used to form the susceptor bearing 100.

Referring again to FIGS. 1 and 2, the susceptor bearing 100 may be sealably mounted on a support 114. The support 114 may comprise a fluid supply channel 112, such as a pipe, conduit or similar fluid delivery device, which is fluidly coupled to the internal chamber 116 of the susceptor bearing 100. The fluid supply channel 112 may be operable to deliver a supply of pressurized fluid to the internal chamber 116. In the embodiments described herein, the pressurized fluid may be a pressurized gas, specifically an inert pressurized gas, including, without limitation, nitrogen, helium, argon, krypton, xenon and the like.

In the embodiment of the system 200 shown in FIG. 1, the susceptor bearing 100 and support 114 are fixed and the tubular glass preform 170 which is drawn over the susceptor bearing 100 is rotated relative to the susceptor bearing 100 as the tubular glass preform 170 is heated, expanded and thinned over the susceptor bearing.

However, in the embodiment of the system 300 shown in FIG. 2, where the system 300 comprises a glass delivery tank 150 for supplying a tube of molten glass to the susceptor bearing 100, the susceptor bearing 100 may be operable to rotate relative to the glass delivery tank 150 such that the susceptor bearing 100 is rotated within the tube of glass drawn over the susceptor bearing 100. For example, in this embodiment, the susceptor bearing 100 and attached support 114 may be operable to rotate such as when the support 114 is mechanically coupled to the rotating armature of an electric motor.

Referring again to FIGS. 1 and 2, a heating system 118 may be disposed around the susceptor bearing 100. In one embodiment, the heating system 118 may comprise an inductive heating system such as a 10 kW induction heating unit manufactured by Axio. However, it should be understood that other types of heating systems may be used including, without limitation, infrared, focused infrared, resistive and/or combination thereof. Further, it should be understood that, while FIGS. 1 and 2 depict the heating system as being disposed around the susceptor bearing 100, the heating system 118 may be integrated with the susceptor bearing 100, such as when the heating system 118 is a resistive heating system.

The heating system 118 may be operable to create at least two distinct heating zones around the susceptor bearing 100. For example, in the embodiment shown in FIGS. 1 and 2, the heating system 118 comprises three separate induction coils: upper induction coil 120, intermediate induction coil 122, and lower induction coil 124. Each induction coil may be independently operated such that three separate heating zones are created around the susceptor bearing 100. For example, upper induction coil 120 may be operated at a first temperature $T_1$ to heat the susceptor bearing 100 to a temperature at or just below the softening temperature of the glass drawn over the susceptor bearing. The intermediate induction coil 122 may be operated at a second temperature $T_2$ which is greater than $T_1$ and the third induction coil may be operated at a third temperature $T_3$ which is less than $T_1$ (e.g., a temperature less than the softening point of the glass). The temperatures at which each of the induction coils are heated will be described in more detail herein with reference to specific compositions of glass drawn over the susceptor bearing 100.

Further, it should be understood that the heating system 118 may cooperate with the compressed fluid emitted from the surface of the susceptor bearing to control a temperature of the glass drawn over the susceptor bearing.

The heating system 118 and the susceptor bearing 100 may be at least partially disposed in an enclosure 126 to shield the heated and softened glass 171 drawn over the susceptor bearing 100 from airborne contaminants such as, for example, dust and/or other particulate matter. The enclosure 126 may also provide thermal insulation to the susceptor bearing and heating system 118.

Still referring to FIGS. 1 and 2, the systems 200, 300 for forming glass sheet from tubes of glass may further comprise a drawing mechanism 128. The drawing mechanism 128 is generally disposed below the susceptor bearing 100 and may comprise at least one tractor wheel operable to contact the tube of glass drawn over the susceptor bearing 100 and draw the tube of glass downward. The drawing mechanism 128 may also assist in rotating the tube of glass. Accordingly, because the drawing mechanisms may impart both downward and rotational motion to the drawn tube of glass, it will be understood that an axis of rotation about which the at least one tractor wheel is rotated is non-parallel to the horizontal axis. Specifically, the at least one tractor wheel may be positioned such that the angular orientation of the at least one tractor wheel is the same as the angle or pitch at which the tube of glass is sectioned.

In the embodiments of the systems 200, 300 shown in FIGS. 1 and 2, the drawing mechanism 128 comprises at least three pairs of opposed tractor wheels equidistantly spaced about the support 114. For example, when the drawing mechanism 128 comprises three pairs of opposed tractor wheels, the tractor wheels may be disposed about the support 114 every 120°.

Each pair of opposed tractor wheels may comprise an internal tractor wheel 130 and an external tractor wheel 132. At least one of the internal tractor wheel 130 and the external tractor wheel 132 may be coupled to a motor such that the wheel is driven. The internal tractor wheels 130 are mounted on the support 114 while the external tractor wheels 132 are mounted on an external support structure (not shown). The external tractor wheels 132 are spaced apart from the corresponding internal tractor wheels 130 such that an expanded glass tube 172 may be disposed between the internal tractor wheel 130 and the external tractor wheel 132. Accordingly, the internal tractor wheel 130 may contact the expanded glass tube 172 on the internal surface of the tube (e.g., along the inner diameter or ID of the expanded glass tube 172) while the external tractor wheel 132 may contact the expanded glass tube 172 on the external surface of the expanded glass tube 172 (e.g., along the outer diameter or OD of the expanded glass tube 172).

In the embodiments described herein, the drawing mechanism 128 may be disposed a sufficient distance below the susceptor bearing 100 such that the expanded glass tube 172 is air cooled to a temperature above the strain point of the glass before being contacted by the tractor wheels of the drawing mechanism 128. For example, for a tube of borosilicate glass such as Pyrex® 7761 (strain point=458° C.) heated and drawn over the susceptor bearing 100, the drawing mechanism 128 may be positioned below the susceptor bearing 100 such that the expanded glass tube 172 is air cooled to at least 650° C. before the expanded glass tube 172 is contacted by the drawing mechanism 128.

Still referring to FIGS. 1 and 2, the systems 200, 300 for forming glass sheet from a tube of glass may further comprise a cutting device 140 which is operable to section an expanded glass tube 172 into a continuous glass sheet 400 or continuous ribbon. The cutting device 140 may comprise a laser, such as a $CO_2$ laser, a quadrupled 266 nm YAG laser, or excimer laser (193/248/308 nm), a mechanical cutting device such as blades, shears, or diamond scorer, or a device which sections the expanded glass tube 172 based on the propagation of thermal stresses in the material. The width of the continuous glass sheet 400 may be controlled by varying the speed at which a tube of glass is fed on to the susceptor bearing, the speed at which the tube of glass is drawn over the susceptor bearing, the relative speed of rotation of the susceptor bearing and the tube of glass, and the pitch at which the expanded glass tube 172 is cut.

In one embodiment, the cutting device 140 is a $CO_2$ laser which is positioned below the drawing mechanism 128. Specifically, the cutting device may be positioned below the drawing mechanism 128 a suitable distance such that the tube of glass is sectioned with the $CO_2$ laser while the tube of glass is at a temperature above the strain point of the glass. Sectioning the glass at a temperature above the strain point of the glass mitigates the development of residual stresses in the sectioned continuous glass sheet 400.

Figure 6A:
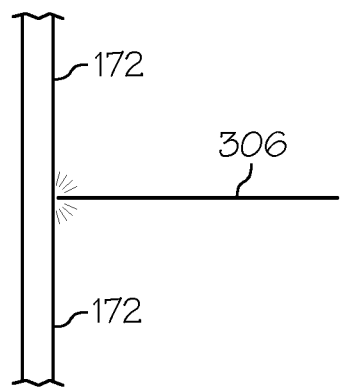
FIGS. 6A-6C schematically depicted a process for sectioning a glass sheet from an expanded glass tube to produce a glass sheet having substantially defect-free edges.
Figure 6B:
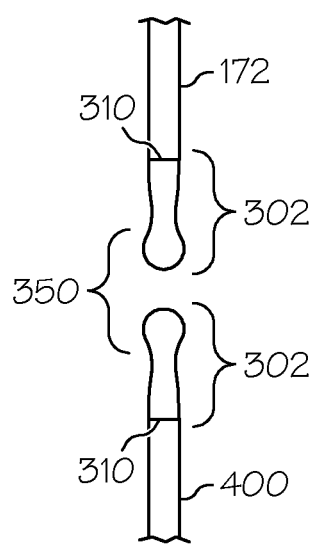
Figure 6C:
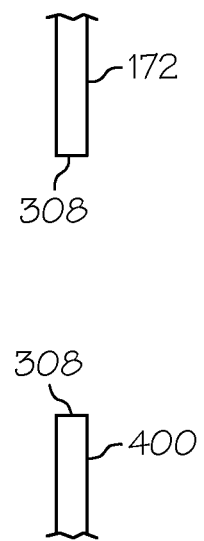

Referring to FIGS. 6A-6C, in another embodiment, the cutting device 140 is a $CO_2$ laser positioned to section the expanded glass tube 172 when the glass is at a temperature below the strain point of the glass. The $CO_2$ laser may be used to section the glass such that the resultant glass sheet has defect-free edges. In this embodiment, the $CO_2$ laser may be a 10.6 micron wavelength Synrad rf-excited $CO_2$ laser with a maximum power of 80 W and beam diameter of 7.2 mm. The beam of the $CO_2$ laser may be focused on to the surface of the glass to be sectioned with a 2.5 inch focusing lens to produce a spot size on the glass of 131 microns.

Referring now to FIGS. 6A-6C, in order to section the glass, the beam 306 of the $CO_2$ laser may be directed on to the expanded glass tube 172 (as shown in FIG. 6A in partial cross section) with sufficient power to cause a separation 350 in the glass by fusion and the formation of a thermally affected zone (TAZ) 302 on either side of the separation 350. In order to section borosilicate glass having a thickness of up to about 150 microns, the power of the $CO_2$ laser may be from about 60 W to about 80 W. The TAZ 302 (shown in FIG. 6B) may generally be about 1 mm in width. The high thermal stresses induced in the glass by the $CO_2$ laser may cause cracks 310 to develop and propagate in the glass directly adjacent to the TAZ 302 and parallel to the cutting path of the $CO_2$ laser. The cracks cause the TAZ 302 to separate from the remainder of the glass (e.g., from the expanded glass tube 172 and sectioned glass sheet 400), as shown in FIG. 6C, leaving defect free edges 308 on each of the expanded glass tube 172 and the sectioned continuous glass sheet 400.

This sectioning technique may be used to section glass having a thickness from about 20 microns to about 150 microns for cutting speeds of about 25 mm/sec to about 45 mm/sec with thinner glass requiring faster cutting speeds for a given laser power. For example, for a borosilicate glass having a thickness of 120 microns, a cutting speed of about 25 mm/sec to about 30 mm/sec with a laser power of about 80 W may be used to produce substantially defect-free edges in the sectioned glass. Similarly, for a borosilicate glass having a thickness of 100 microns, a cutting speed from about 35 mm/sec to about 40 mm/sec with a laser power of about 80 W may be used to produce substantially defect-free edges while borosilicate glass having a thickness of 70 microns may be sectioned with cutting speeds from about 40 mm/sec to about 45 mm/sec with a laser power of about 80 W to produce substantially defect-free edges.

Regardless of the technique used to section the glass, the cutting device 140 may be positioned to section the expanded glass tube 172 along the line where the tractor wheels of the drawing mechanism 128 make contact with the expanded glass tube 172 such that any defects which may be introduced into the glass by contact with the tractor wheels of the drawing mechanism are located in cutting path of the laser and therefore eliminated as the glass is sectioned.

Further, it should be understood that the cutting device 140 may be positioned at an angle or pitch relative to the glass such that the glass is helicoidally or spirally sectioned from the expanded glass tube 172. The pitch may be set by adjusting the angular orientation of the cutting device with respect to the expanded glass tube. The pitch of the cutting device, in conjunction with the draw speed of the drawing mechanism, determines the width of the resulting continuous glass sheet 400.

Referring again to FIGS. 1 and 2, the systems 200, 300 for forming glass sheets from a tube of glass may further comprise a take-up mechanism 160. The take-up mechanism 160 may generally comprise a rotating spool or roll 162 on to which the sectioned continuous glass sheet 400 may be wound. The axis of rotation 161 of the take-up mechanism 160 may be generally perpendicular to the pitch on which the expanded glass tube 172 is sectioned such that the sectioned continuous glass sheet 400 may be uniformly wound on to the spool or roll. Further, the speed of rotation of the take-up mechanism 160 may be varied to coincide with the rate at which the tube of glass is drawn over the susceptor bearing 100 and sectioned into the continuous glass sheet 400.

Reference will now be made to FIGS. 1 and 2 to illustrate the functionality of the systems 200, 300 for forming continuous glass sheet from a tube of glass. In one embodiment, the tube of glass is a rigid, tubular glass preform 170 which may be positioned over the top portion 102 of the susceptor bearing 100 as shown in FIG. 1. As depicted herein, the tubular glass preform 170 may generally comprise a hollow glass cylinder with an inner diameter which is slightly larger than the diameter of the top portion of the susceptor bearing 100. The tube of glass may have a wall thickness on the order of several millimeters. For example, in one embodiment, the tube of glass may be 2 mm thick. However, it should be understood that the tube of glass may have a wall thickness of greater than 2 mm or less than 2 mm. Further, while the tubular glass preform is shown and described herein as being a cylinder or cylindrical, it should be understood that the tubular glass preform may have various other geometrical configurations. For example, in one embodiment, the tubular glass preform 170 may be elliptical or oval in cross section or a similar elongated cross section.

The tubular glass preform 170 may comprise borosilicate glass such as, for example, 7761 Pyrex® or similar Pyrex® glass compositions, Jade™, or Eagle 2000™. In one embodiment, the tubular glass preform 170 may be rotated relative to the susceptor bearing 100 at a rate from about 2 rpm to about 10 rpm as the tubular glass preform 170 is fed on to the susceptor bearing 100 by gravity.

As the tubular glass preform 170 is fed on to the susceptor bearing 100, the heating system 118 may be used to heat the tubular glass preform 170 to a temperature above the softening point of the glass. For example, when the tube of glass fed over the susceptor bearing 100 is a solid glass preform, the upper induction coil 120 may be operated to pre-heat the tube of glass to a temperature just below the softening point of the glass. For example, when the tubular glass preform 170 comprises 7761 Pyrex®, the induction coil 120 may be used to heat the tubular glass preform 170 to a first temperature T1 of 650° C.

While in one embodiment the tube of glass drawn over the susceptor bearing 100 is a solid tubular glass preform 170, in another embodiment, the tube of glass may initially be a tube of molten glass. For example, as depicted in FIG. 2, the top portion of the susceptor bearing 100 may be coupled to a glass delivery tank 150 which contains molten glass 152. The molten glass may be a borosilicate glass composition such as, for example, 7761 Pyrex® or similar Pyrex® glass compositions, Jade™, or Eagle 2000™. As the molten glass 152 exits the glass delivery tank 150 and flows over the susceptor bearing 100, the top portion of the susceptor bearing 100 forms the molten glass into a hollow tube having an inner diameter of the same dimension as the diameter of the top portion of the susceptor bearing 100. In this embodiment, the susceptor bearing 100 may be rotated from about 2 rpm to about 10 rpm as the glass flows over the susceptor bearing 100.

As the molten glass 152 flows over the susceptor bearing 100, the glass begins to air cool and solidify. In order to maintain the flow of the glass tube over the susceptor bearing 100, the heating system 118 may be used to maintain the temperature of the tube of glass above the softening point of the glass. For example, as described above, the upper induction coil 120 may be used to maintain the glass at a first temperature T1 above the softening point of the glass as the glass is fed downward, over the susceptor bearing 100.

The initial feed of glass is gravity fed or drawn or pulled downward over the susceptor bearing 100 until the glass can be placed in contact with the tractor wheels of the drawing mechanism 128. Thereafter, a combination of gravity feeding and drawing with the drawing mechanism 128 are used to maintain a continuous draw of glass over the susceptor bearing 100.

Referring now to FIGS. 1-4, as the glass 170 reaches the upper intermediate portion 104 of the susceptor bearing 100, the glass may be further heated by the intermediate induction coil 122 to a second temperature $T_2$ above the softening point of the glass to increase the plastic flow of the glass. For example, when the glass is 7761 Pyrex®, the second temperature $T_2$ may be about 885° C. Once the glass of the preform is heated above the softening temperature the glass becomes pliable and generally conforms to the shape of the susceptor bearing 100 as the glass is fed downward, over the susceptor bearing. Accordingly, due to the shape of the upper intermediate portion 104 of the susceptor bearing 100, the diameter of the softened glass 171 is both expanded (e.g., the circumference of the softened glass 171 is increased) and thinned (e.g., the thickness of the softened glass 171 is decreased) as the softened glass 171 is drawn over the upper intermediate portion 104 of the susceptor bearing 100.

Figure 4:
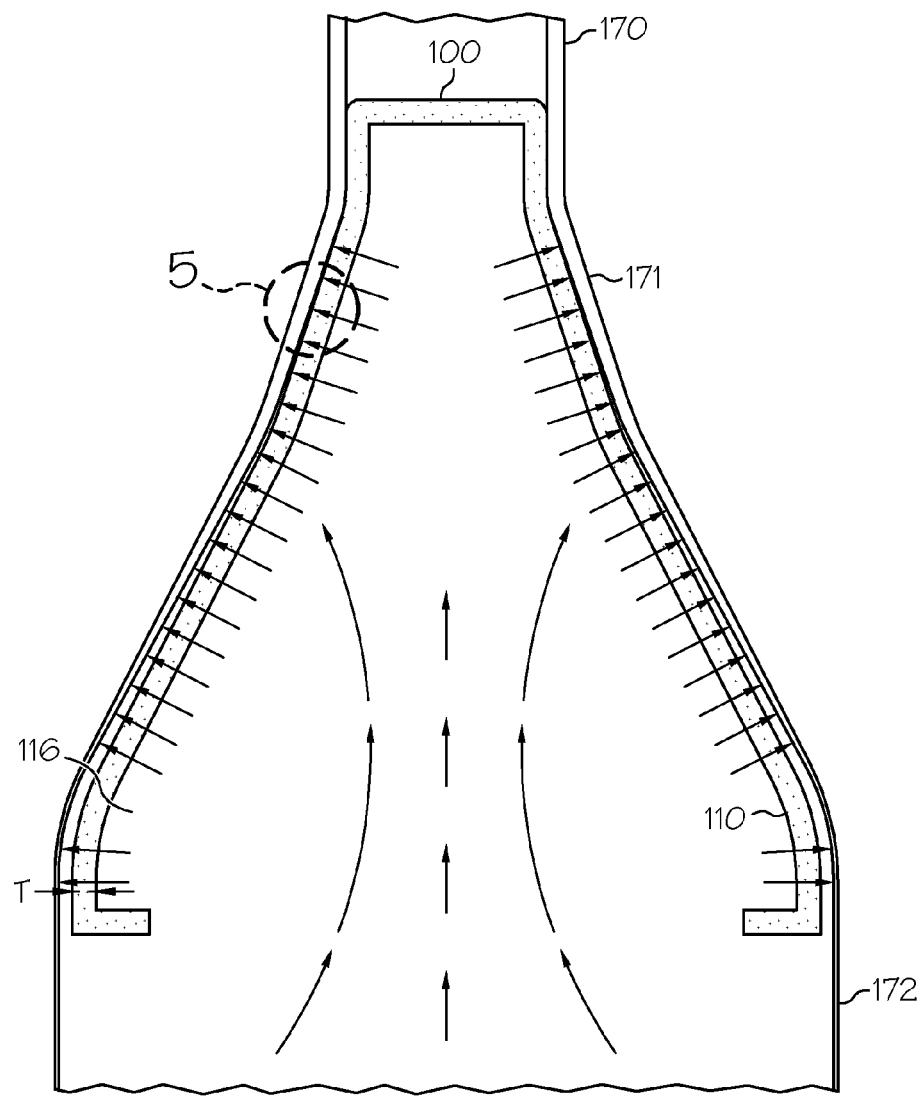
FIG. 4 is a schematic diagram showing a tube of glass being drawn over the susceptor bearing of FIG. 3.
Figure 5:
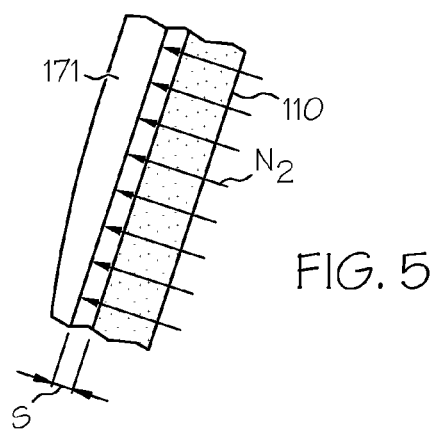
FIG. 5 is an enlarged view of a portion of the susceptor bearing of FIG. 4 showing the spacing between the softened glass and the susceptor bearing.

Referring now to FIGS. 4 and 5, as the softened glass 171 is drawn over the susceptor bearing 100, particularly as the softened glass 171 is drawn over the upper intermediate portion 104, the lower intermediate portion 106 and the bottom portion 108 of the susceptor bearing 100, the softened glass 171 is supported or suspended over the surface of the susceptor bearing 100 such that there is no mechanical contact between the susceptor bearing 100 and the softened glass 171. This is accomplished by supplying a compressed fluid such as, for example, compressed nitrogen gas, to the internal chamber 116 of the susceptor bearing 100 via the fluid supply channel 112. The pressure of the fluid in the inner chamber may be from about 0.5 to about 3 bars such that a flux of the pressurized fluid is emitted through the porous sidewall of the susceptor bearing 100. The flux of fluid through the porous sidewall blows the softened glass 171 outwards, away from the surface of the susceptor bearing 100 in a radial direction thereby further expanding and thinning the softened glass 171 while preventing the softened glass 171 from contacting the surface of the susceptor bearing 100. For example, as shown in FIG. 5, the softened glass 171 may be supported above the surface of the sidewall 110 of the susceptor bearing 100 by the fluid flux by a distance S of less than about 200 microns, preferably less than about 150 microns, more preferably less than about 120 microns.

It should be understood that expansion and thinning of the softened glass 171 primarily takes place over the upper intermediate portion 104 of the susceptor bearing 100 due to the shape of the susceptor bearing. The amount of radial expansion that takes place in the softened glass 171 may be related to the shape and dimensions of the susceptor bearing 100 as well as the amount of fluid flux through the sidewall 110 of the susceptor bearing 100 (e.g., the greater the fluid flux, the further the softened glass 171 is blow or suspended over the susceptor bearing 100). The amount of thinning or reduction in thickness of the softened glass 171 may be dependent on the shape and dimensions of the susceptor bearing 100, the flux of fluid through the sidewall 110 of the susceptor bearing 100, the rate at which glass is fed on to the susceptor bearing 100, and the rate at which the glass is drawn over the susceptor bearing 100 by the drawing mechanism 128. Generally, the faster the softened glass is drawn, the thinner the softened glass becomes.

Referring again to FIGS. 1-4, after the softened glass 171 has been expanded and thinned over the upper intermediate portion 104 of the susceptor bearing 100, the lower intermediate portion 106 transitions the softened glass to the bottom portion 108 of the susceptor bearing 100 where the softened glass 171 is calibrated to its final dimensions. As the softened glass 171 traverses over the bottom portion 108 of the susceptor bearing 100, the temperature of the glass is rapidly decreased below the softening point of the glass in order to solidify the glass such that the glass maintains its cylindrical shape and thickness. For example, when the glass is 7761 Pyrex®, the lower induction coil 124 may be set to heat the glass to a temperature of 810° C. such that the glass can be rapidly air cooled to "freeze" in the desired dimensions.

After cooling below the softening point, the tube of glass (now expanded glass tube 172) is contacted by the drawing mechanism 128 which exerts both a downward draw force and circumferential or rotational force on the expanded glass tube 172. As noted hereinabove, the tractor wheels 130, 132 of the drawing mechanism 128 may contact the expanded glass tube 172 while the glass is above the strain point of the glass. For example, when the glass is 7761 Pyrex, the drawing mechanism 128 contacts the expanded glass tube 172 when the glass has a temperature of about 600° C.

After the expanded glass tube 172 has been downwardly drawn, the expanded glass tube 172 may be sectioned into a continuous glass sheet 400, as described hereinabove. More specifically, the expanded glass tube 172 is sectioned along the path of travel of the tractor wheels thereby eliminating any defects caused by the mechanical contact of the tractor wheels with the glass. In the embodiments shown and described herein, the tube is helicoidally or spirally sectioned to form the expanded glass tube into a continuous glass sheet. Thereafter, the continuous glass sheet 400 may be wound on to a storage spool or roll with the take-up mechanism 160.

The systems and methods described herein may be utilized to form continuous glass sheets from a tube of glass. More specifically, the methods and systems described herein may be utilized to form continuous glass sheets having a thickness of less than about 150 microns, more preferably less than about 100 microns and, most preferably, less than about 50 microns. Because mechanical contact with the glass is minimized during formation of the glass sheets, the continuous glass sheets formed utilizing the systems and methods describe herein may have a low surface roughness. For example, the continuous glass sheets may have a surface roughness of less than about 2 nm Ra, more preferably less than about 1 nm Ra and, most preferably, less than about 0.6 nm Ra.

Further, it should be understood that the methods and systems described herein may be utilized to form glass sheets having various widths. For example, a susceptor bearing having a maximum outer diameter (e.g., the diameter of the bottom portion) of about 700 mm may be used to produce continuous glass sheets having a width of up to about 2.1 meters. However, it should be understood that the same susceptor bearing may also be utilized to form narrow ribbons of glass by adjusting the pitch of the cutting device and/or the feed and draw rates of the glass over the susceptor bearing.

EXAMPLES

The aforementioned embodiments will be further clarified by the following examples.

Example 1

A hollow tubular glass preform of 7761 Pyrex® (softening point=820° C., strain point=458° C.) having an inner diameter of 56 mm, an outer diameter of 60 mm and a thickness of 2 mm is disposed over a susceptor bearing having a top portion with an outer diameter of 55.4 mm, a bottom portion with an outer diameter of 102 mm and a sidewall having a thickness T of 6 mm. The tubular glass preform was rotated at a rate of 4 rpm with respect to the susceptor bearing 100. The tubular glass preform was heated to a first temperature T1 of 650° C. around the top portion of the susceptor bearing, to a second temperature T2 of 885° C. around the upper intermediate portion of the susceptor bearing, and to a third temperature T3 of 810° C. around the bottom portion of the susceptor bearing as the preform was drawn over the susceptor bearing at a rate of 100 mm/min. The softened glass of the tubular glass preform was blown and suspended over the susceptor bearing by a distance of about 120 microns by providing a pressurized flow of nitrogen gas to the internal chamber of the susceptor bearing at a pressure of about 0.8 bar, which, in turn, was emitted through the sidewall of the susceptor bearing. After being drawn over the susceptor bearing the expanded glass tube was cooled to below the softening temperature. The final circumference of the tubular glass preform was increased from about 60 mm to about 102 mm while the thickness of the tubular glass preform was reduced from 2 mm to about 50 microns. Thereafter, the glass was sectioned and surface roughness measurements were performed on the sectioned glass with a Zygo surface metrology instrument. The sectioned glass had a surface roughness of less than about 0.6 nm Ra which is attributable to the non-contact methods of forming the glass from the tubular glass preform.

One advantage of the methods and systems described herein is the ability to form a continuous glass sheet from a cylindrical feed of glass which is flexible enough to be rolled on to a storage spool. Because the glass sheet is continuous, the glass may be utilized to form large or small individual sheets of glass from a single spool of glass. Moreover, the rolled continuous glass sheet may facilitate incorporating the material into a large scale commercial production operation where the glass may be accurately paid out from a single source and cut to size thereby reducing the handling required with a plurality of individually formed glass sheets.

In addition to the characteristics of the continuous glass sheets formed utilizing the methods and systems described herein, the methods and systems described herein are also environmentally friendly. For example, the systems described herein are relatively compact systems where only the interior of the system is heated with very limited heating losses to the outside environment. Further, the amount of nitrogen consumed or released by the process is also relatively low. Finally, the power consumed in heating the glass is relatively low in comparison to other glass forming operations.

It will be apparent to those skilled in the art that various modifications and variations can be made to the embodiments described herein without departing from the spirit and scope of the invention. Thus it is intended that the embodiments described herein cover any modifications and variations provided they come within the scope of the appended claims and their equivalents.

What is claimed is:

1. A method for forming a continuous glass sheet, the method comprising:

thinning and expanding a tube of glass by drawing the tube of glass over a susceptor bearing comprising a porous sidewall defining an internal chamber, wherein a diameter of the susceptor bearing increases between a top portion of the susceptor bearing and a bottom portion of the susceptor bearing and the tube of glass is maintained at a temperature above a softening point of the glass as the tube of glass is drawn over the susceptor bearing;

blowing the glass tube away from the susceptor bearing in a radially outward direction with a pressurized fluid supplied to the internal chamber and emitted from the porous sidewall as the tube is drawn over the susceptor bearing thereby suspending the tube of glass over the susceptor bearing;

cooling the tube of glass; and sectioning the tube of glass to form a continuous glass sheet.

2. The method of claim 1 further comprising winding the continuous glass sheet onto a storage spool.

3. The method of claim 1 wherein the tube of glass is molten glass and the method further comprises cooling the tube of glass to the temperature above the softening point of the glass as the tube of glass is drawn over the susceptor bearing.

4. The method of claim 3 wherein the tube of glass is air cooled as the tube of glass is drawn over the susceptor bearing.

5. The method of claim 1 wherein the tube of glass is a solid glass preform and the method further comprises heating the tube of glass to the temperature above the softening point of the glass as the tube of glass is drawn over the susceptor bearing.

6. The method of claim 1 further comprising rotating the tube of glass relative to the susceptor bearing as the tube of glass is drawn over the susceptor bearing.

7. The method of claim 1 further comprising rotating the susceptor bearing relative to the tube of glass as the tube of glass is drawn over the susceptor bearing.

8. The method of claim 1 wherein the susceptor bearing comprises the top portion, an upper intermediate portion, a lower intermediate portion and the bottom portion, wherein:

the top portion is substantially cylindrical;

the upper intermediate portion is substantially conical;

the lower intermediate portion is substantially spherical; and the bottom portion is substantially cylindrical.

9. The method of claim 1 wherein the temperature of the tube of glass is maintained at the temperature above the softening point of the glass with a heating system disposed around the susceptor bearing, and wherein the heating system cooperates with the pressurized fluid emitted from the susceptor bearing to maintain the temperature of the glass at the temperature above the softening point of the glass.

10. The method of claim 1, wherein the tube of glass surrounds the porous sidewall of the susceptor bearing.

11. The method of claim 1, wherein the diameter of the tube of glass adjacent the top portion of the susceptor bearing is smaller than the diameter of the tube of glass adjacent the bottom portion of the susceptor bearing.

12. The method of claim 1, wherein the porous sidewall has a radial thickness that is non-uniform.

13. A system for forming a continuous glass sheet comprising a susceptor bearing, a heating system, a drawing mechanism and a cutting device, wherein:

the susceptor bearing comprises a porous sidewall defining an internal chamber for receiving a pressurized fluid, wherein a diameter of the susceptor bearing increases between a top portion of the susceptor bearing and a bottom portion of the susceptor bearing and the susceptor bearing is operable to emit the pressurized fluid through the porous sidewall such that, when a heated tube of glass is drawn over the susceptor bearing, the heated tube of glass is blown away from the susceptor bearing in a radially outward direction thereby suspending the tube of glass over the susceptor bearing;

the heating system surrounds the susceptor bearing and cooperates with the pressurized fluid emitted from the susceptor bearing to regulate a temperature of a tube of glass drawn over the susceptor bearing;

the drawing mechanism is disposed below the susceptor bearing and comprises at least one tractor wheel positioned to contact the tube of glass and draw the tube of glass over the susceptor bearing in a downward direction; and the cutting device is positioned below the drawing mechanism and is operable to section the tube of glass into a continuous glass sheet.

14. The system of claim 13 further comprising a take-up mechanism for winding the continuous glass sheet onto a storage spool.

15. The system of claim 13 wherein the susceptor bearing comprises the top portion, an upper intermediate portion, a lower intermediate portion, and the bottom portion, wherein:
the top portion is substantially cylindrical;
the upper intermediate portion is substantially conical;
the lower intermediate portion is substantially spherical; and
the bottom portion is substantially cylindrical.

16. The system of claim 13 wherein the heating system is operable to provide at least two temperature zones along an axial length of the susceptor bearing.

17. The system of claim 13 wherein the susceptor bearing is operable to rotate with respect to the heating system.

18. The system of claim 13 wherein the at least one tractor wheel of the drawing mechanism comprises three pairs of opposed tractor wheels.

19. The system of claim 13, wherein when the heated tube of glass is drawn over the susceptor bearing, it surrounds the porous sidewall.

20. The system of claim 13, wherein the heating system comprises more than one induction coil, wherein each of the more than one induction coil is independently controlled.

\* \* \* \* \*